United States Patent [19]

Hopkins

[11] Patent Number: 5,999,624

[45] Date of Patent: *Dec. 7, 1999

[54] REMOTE FINANCIAL TRANSACTION SYSTEM

[75] Inventor: W. Dale Hopkins, Gilroy, Calif.

[73] Assignee: Compaq Computer Corporation, Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,428

[22] Filed: Dec. 24, 1996

Related U.S. Application Data

[63] Continuation of application No. 08/269,205, Jun. 30, 1994, abandoned.

[51] Int. Cl.⁶ ............................ H04K 1/00; H04L 9/00; G06F 17/60; G06K 15/00
[52] U.S. Cl. ........................... 380/24; 380/23; 380/25; 380/49; 705/16; 705/18; 705/41; 705/42; 705/44
[58] Field of Search .................... 380/23, 24, 49, 380/25; 235/379; 902/2, 4, 22; 395/216–227; 405/16, 18, 35, 39, 40, 42, 43, 44

[56] References Cited

U.S. PATENT DOCUMENTS

| | | | |
|---|---|---|---|
| 3,696,297 | 10/1972 | Otero | 380/23 |
| 3,731,076 | 5/1973 | Nagata et al. | |
| 3,971,916 | 7/1976 | Moreno. | |
| 4,007,355 | 2/1977 | Moreno. | |
| 4,092,524 | 5/1978 | Moreno. | |
| 4,102,493 | 7/1978 | Moreno. | |
| 4,200,770 | 4/1980 | Hellman et al. | 380/30 |
| 4,386,233 | 5/1983 | Smid et al. | 178/22.08 |
| 4,386,266 | 5/1983 | Chesarek | 235/380 |
| 4,405,829 | 9/1983 | Rivest et al. | 380/30 |
| 4,423,287 | 12/1983 | Zeidler | 178/22.08 |
| 4,424,414 | 1/1984 | Hellman et al. | 380/30 |
| 4,438,824 | 3/1984 | Mueller-Schlor | 178/22.08 |
| 4,451,701 | 5/1984 | Bendig | 179/2 TV |
| 4,453,074 | 6/1984 | Weinstein | 235/380 |
| 4,536,647 | 8/1985 | Atalla et al. | 380/24 |
| 4,601,011 | 7/1986 | Grynberg | 380/23 |
| 4,630,201 | 12/1986 | White | 380/24 |
| 4,652,698 | 3/1987 | Hale et al. | 380/24 |
| 4,870,683 | 9/1989 | Atalla | 380/56 |
| 4,885,779 | 12/1989 | Atalla et al. | 380/56 |
| 4,890,321 | 12/1989 | Seth-Smith et al. | 380/20 |
| 5,014,125 | 5/1991 | Pocock et al. | 358/86 |
| 5,050,207 | 9/1991 | Hitchcock | 379/96 |
| 5,093,718 | 3/1992 | Hoarty et al. | 358/84 |
| 5,144,663 | 9/1992 | Kudelski et al. | 380/16 |
| 5,157,717 | 10/1992 | Hitchcock | 379/96 |
| 5,220,501 | 6/1993 | Lawlor et al. | 364/408 |
| 5,283,829 | 2/1994 | Anderson | 380/24 |
| 5,291,554 | 3/1994 | Morales | 380/5 |
| 5,371,797 | 12/1994 | Bocinsky | 380/24 |

FOREIGN PATENT DOCUMENTS

| | | |
|---|---|---|
| 788638 | 6/1968 | Canada. |
| 870820 | 5/1971 | Canada. |
| 928429 | 6/1973 | Canada. |
| 1164000 | 9/1969 | United Kingdom. |
| 1314021 | 4/1973 | United Kingdom. |

*Primary Examiner*—Pinchus M. Laufer
*Assistant Examiner*—Hrayr A. Sayadian
*Attorney, Agent, or Firm*—Fenwick & West LLP

[57] ABSTRACT

An apparatus and method for performing remote financial transactions over an interactive network using a user operated payment module such as an initialized remote control device. The secure remote financial transaction system uses password security as well as a secure method for selecting and implementing personal passwords.

22 Claims, 5 Drawing Sheets

REMOTE FINANCIAL TRANSACTION SYSTEM

This application is a continuation of application Ser. No. 08/269,205 filed Jun. 30, 1994, now abandonded.

BACKGROUND OF THE INVENTION

The present invention relates to a method and apparatus for securing and conducting financial transactions from remote locations, in which there is communication between the remote location and off-site transaction recording or processing locations.

Various techniques have been developed for maintaining security and secrecy of remotely conducted financial transactions. Such techniques commonly rely on the use of secret passwords, which typically are called personal identification numbers, or PINs. In a transaction, the PIN generally is used in conjunction with a second form of identification which is physically scanned by a reading device.

One known technique for remote transactions are bank automatic teller machines ("ATMs") and electronic fund transfer at point-of-sale terminals ("EFT-POS" terminals). Typical ATMs and EFT-POS terminals require the user to insert a card containing an encoded magnetic strip. Information is read from the magnetic strip. For example, Track 1 information may be read, including the user's name, account number, card validation value ("CVV") and expiration date. In addition, the user typically is required to input a PIN in order to commence any transactions. The PIN typically is assigned by a registering institution, such as a bank or credit card company. In one approach, the registering institution assigns the PIN to the user. In other approaches, the user is able to self-select a PIN. In a self-selection system, the user can personally visit the registering institution and make the selection there. The automatic teller machine typically is at location removed from the user's home.

ATM and EFT-POS networks are also known. One such network is described in the ANSI X9.24 standard. In such a network, ATM (or EFT-POS) machines from different financial institutions are connected through a central processing institution. Using such networks, for example, a user with an account at a particular bank may conduct financial transactions, such as bank account withdrawals, from a different bank. Such networks are widely known and have such trade names as "NYCE", "PLUS" and "CIRRUS". In a typical network, the ATMs of one bank are connected to a data processing unit of that bank. Other banks connected to the network have similar ATM arrangements. The data processing units of each bank on the network are in turn connected to a central processing institution. The central processing institution thereby acts as a router or a financial network switch sending transaction requests to the appropriate bank on the network.

ATM systems have been subject to various forms of hostile attack. For example, the PINs are accessible because users must input them into the system by the user in an unencrypted form. Although the ATM terminals typically encrypt the PINs before transmitting them from the terminals over the ATM network, they typically use one encryption key for multiple PINs. Thus, they also have been subject to dictionary attack in which a known PIN is used as an attack base. When the known encrypted PIN is intercepted by a monitor (such as by detecting the associated unencrypted account information), and when an identical encrypted PIN is intercepted (corresponding to a different account), then the PIN for that account is known because the same encryption key is used.

Various techniques are known for selecting and encrypting the PIN from a remote site, rather than in person at the registering institution. A paper encryption system is described in U.S. Pat. Nos. 4,870,683 and 4,885,779. Using the paper encryption system the user may select and encrypt the PIN at home and then mail it to the registering institution. The user also may transmit the encrypted PIN to the registering institution over the telephone lines. In another known technique for selecting and encrypting a PIN at a remote site, the user communicates with the encryption system electronically (such as via modem communication) and sends an identifier and receives back an encrypted identifier. Such a system is described in commonly-assigned co-pending U.S. patent application Ser. No. 08/029,833.

Various unsecured at-home purchasing systems are known. One such system is television home shopping. Typical television home shopping systems include the QVC network and the Home Shopping Channel. In such television home shopping systems, broadcast programming is received by a television receiver. The programming typically includes a description of the product being sold, a video display, a price and ordering instructions. Typically, the user is provided a toll-free telephone number, such as an "800" number to call for placing an order. The user may order using a credit card in which various information must be given to the order taker. Such a system is unsecured because the telephone lines are subject to hostile attack, such as by monitors or eavesdroppers. Likewise, the credit card information is not encrypted, so the attackers may obtain information, either through the telephone lines or at the order receiving facility.

Other kinds of television services offer unsecured interactive ordering through a television receiver. One such service commonly is offered in hotels for remote check-out processing from the hotel room. In such a service, the hotel guest is offered various check-out options on the in-room television receiver. For example, the guest may be offered various options, including reviewing charges to the room, such as meal, daily board and telephone fees, and automatic check-out without personally visiting the registration services desk in the hotel's lobby. The options are offered in a menu system appearing on the television screen typically through a cable. The guest scrolls through the menus and selections using a remote control device, such as a typical television infra-red hand-held controller. Likewise, the different menu options are selected using the hand-held controller. Such a system does not enable payment directly through the television. Typically the hotel receives prepayment, such as by presentation of a credit card (and optionally additional identification) upon check-in registration at the front desk. In addition, the system is subject to hostile attack through intercepting the television signal, such as through the cable system, and through access to the hotel records pertaining to guest credit card information.

Another interactive television ordering system is used for ordering or blocking pay-per-view movies. One such pay-per-view service, such as offered in hotel rooms, gives the user a selection of various movies to request (while the fee is added to the hotel bill), as well as the option to block out certain movies or all pay-per-view selections. As with the check-out system, the user may use a typical hand-held television or VCR remote control to scroll through the menus and make selections. Again payment may not be made directly by the user. Instead, the fees are added to the hotel or cable bill. Like the check-out system, this movie ordering system is subject to hostile attack.

Computer bulletin board services provide another form of at-home purchasing. One such service is Compuserve, 5000 Arlington Centre Blvd., P.O. Box 20212, Columbus, Ohio 43220. In such systems, the user typically communicates to a remote computer system from a personal computer. A modem typically is used to initiate a telephone contact between the remote computer and the bulletin board system. The user may have the option of browsing various services and products offered for sale. Payment typically is made by credit card or by check through the mail. Such a system is subject to hostile attack, such as through telephone eavesdroppers and monitors, monitors with direct access to the bulletin board computer, hacker attack from off-site locations, or through access to the mail.

SUMMARY OF THE INVENTION

The present invention alleviates to a great extent the risks and disadvantages of the known techniques and apparatus by providing a secure remote financial transaction system using password security as well as a secure method for selecting and implementing personal passwords. The present invention provides an apparatus and method for performing remotely conducted financial transactions over an interactive network using a payment module such as an initialized remote control device.

More specifically, the payment module communicates with a receiving device which is connected to an interactive network, such as a television connected to a cable system, in order to conduct a financial transaction such as a purchase of goods or services. In other embodiments, the payment module is separate from the control device.

In the preferred embodiment, a programming originator provides goods and services for sale through broadcast or cable television. Alternatively, the goods or services may be provided through other known forms of interactive transmission, such as satellite transmission or computer communication through telephone lines. The user may view the programming and optionally scroll through different goods or services selections using a control device. If the user wishes to make a purchase or conduct a financial transaction, various options are provided through on-screen graphical displays, such as menus. If a particular transaction, such as a purchase, is desired, the user selects that option from the graphical display. The user is prompted to enter a password (referred to herein as a "PIN") into the control device. Entering the PIN activates the payment module. The user may then select a payment method, such as any one of the user's various pre-initialized credit or debit cards.

An encrypted PIN is stored in the payment module, corresponding to the unencrypted PIN. The payment module preferably encrypts the already encrypted PIN using the derived unique keys per transaction technique (the "DUKPT" technique) such as set forth for example in the ANSI X9.24 standard before sending it over the network.

The payment module then sends the encrypted PIN (or doubly encrypted PIN) along with pertinent data (such as the credit or debit card's Track 1 or Track 2 data) through the interactive network (the "network"). The network's host system then sends this information to the appropriate financial institution, such as the acquiring bank, and the transaction is then passed through the financial network to the card issuer where the encrypted information is decrypted and the transaction is approved or declined. The approval/decline is sent back to the user and a corresponding approval/decline message appears on the user's display screen.

The payment module is initialized in the preferred embodiment with its DUKPT keys. Identifying information corresponding to the desired credit and debit card also are entered into the payment module. Preferably this information is input in the form of a sequence of numbers entered by the user into the payment module. Typically this must only be done once for each desired card and is aided by graphical prompts and instructions appearing on the user's monitor. The user also preferably enters an encrypted version of the PIN corresponding to each card. A paper encryptor system as described above may be used to encrypt the PIN. The encryption key is not maintained in the payment module.

It also is preferred that the user be required to select a personal access password that will be used to control access to the payment module. Multiple users may use the same payment module, each with a personal access password controlling access to that user's own cards.

Using the present invention, secure transactions are conducted without using a magnetic strip reader, such as is required in existing systems such as ATM networks. Accordingly, the payment module may be less bulky than a magnetic strip reader because the apparatus required for reading the magnetic strip are not required.

Since the unencrypted PIN is never in the clear, either in the payment module or in the interactive network, the system provides even greater security than is normally provided in ATM networks or retail point of sale terminal. The PINs are stored in an encrypted form in the payment module and are not transmitted over the network in unencrypted form. The decryption keys (the "keys") are not maintained in the payment module. Rather, the keys are maintained only at the card issuer and are not in possession of any other entity within the network.

In addition, unique keys are used (such as using the DUKPT technique and paper encryptor), frustrating hostile attack, including dictionary attack.

In addition, the payment module of the present system is fully compatible with existing ATM and point of sale networks. Further security is provided as described above through the use of encryption and password protection.

Furthermore, the transaction system of the present invention provides individual banks (and other payment account maintaining institutions) discretion regarding whether the remote financial transaction system may make use of accounts maintained by the individual bank as well as any terms of use.

In addition, the apparatus of the present invention is more compact and less expensive than current means of conducting remote transactions. For example, the space and expense of magnetic stripe readers and display screens (other than the user's existing display) are avoided.

BRIEF DESCRIPTION OF THE DRAWINGS

The above and other objects and advantages of the invention will be apparent upon consideration of the following detailed description, taken in conjunction with the accompanying drawings in which like reference characters refer to like parts throughout and in which.

DETAILED DESCRIPTION OF THE INVENTION

Figure 1:
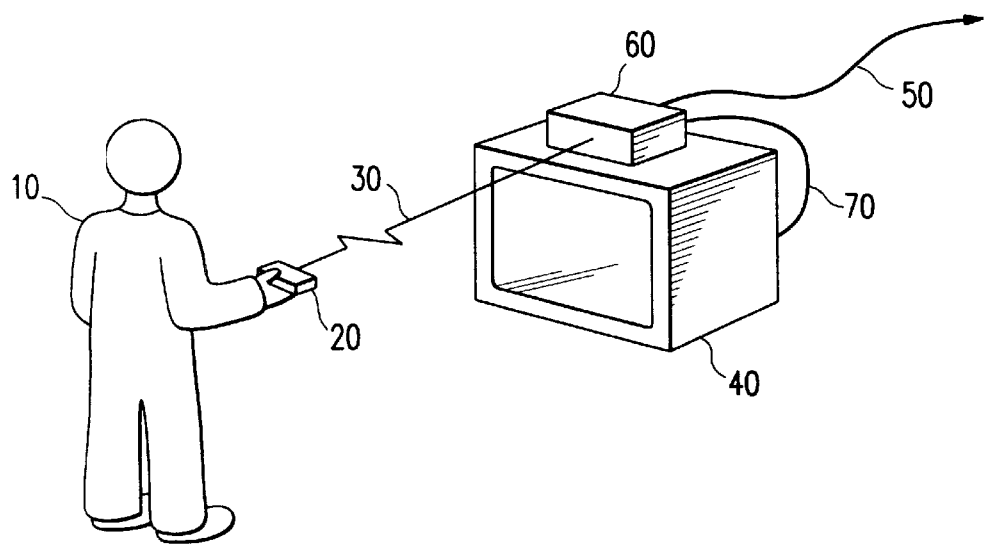
FIG. 1 is a diagram of a local system of the remote financial transaction system of the present invention.

FIG. 1 illustrates a secure at-home payment system embodiment of the present invention. The user 10 operates a payment module 20. In the illustrated embodiment, the payment module 20 incorporates a remote control device which communicates with a receiver. The communication with the receiver may be accomplished by any means of communication linking 30, such as over wires, or, preferably by non-wired transmission. Any form of non-wired linking may be used. Infra-red transmission typical in television remote control devices is preferred, but other forms on non-wired transmission also may be used. For example, microwave, sonic or radio wave transmissions may be used.

The payment module and control device preferably are integrated into the same device as illustrated in FIG. 1. However, in other embodiments, the payment module may be incorporated in other apparatus components or may be a stand-alone device. Where the payment module is incorporated in other apparatus components, a remote controller may be used to communicate with the payment module. Alternatively, a keyboard, joystick, mouse, or other form of controller may be used.

Figure 2:
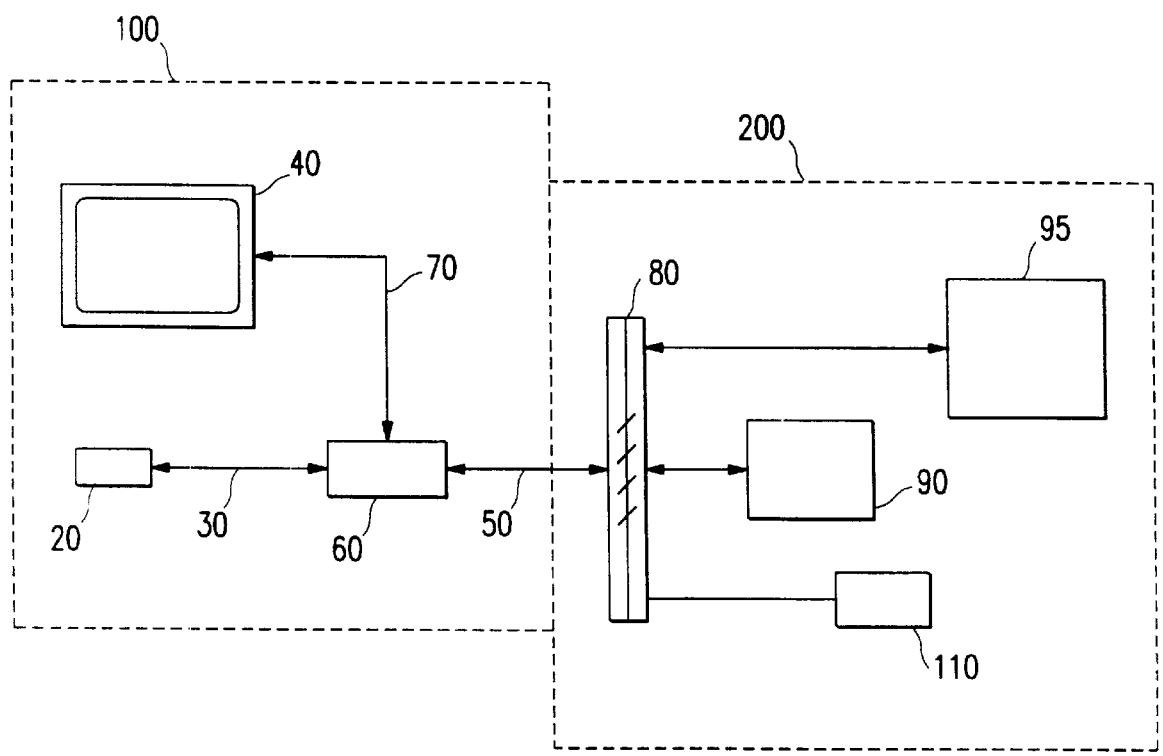
FIG. 2 is a block diagram of a remote financial transaction system of the present invention.

Other at-home components of the payment system include a visual display screen 40, such as a television screen, and a connector 50 for accessing an interactive communications network 80 (illustrated in FIG. 2).

Various forms of visual display screens 40 may be used. Preferably, a television is used, but a computer monitor, liquid crystal display or other form of display may also be used. Likewise, a non-visual display may be used, such as an audio interface or telephone.

In the preferred embodiment, the connector 50 is a cable connection of the type used to connect to television cable systems. Where the interactive communications network 80 is a cable system, a network interface 60, such as a cable box typically will also be used to communicate over the network 80. The connector cable 50 is connected to the cable box 60 as illustrated in FIG. 1.

The interactive network 80 may be any type of network in which data may be transmitted from the user's local system 100 to a remote system 200 and data may be received by the user through the network 80 from the remote system 200. In addition to television cable systems, various forms of interactive networks are known, including ATM networks, wide-area computer networks, local-area computer networks and computer communications through telephone lines. In one embodiment of the present invention, the interactive network 80 includes a cable television system interfaced with an ATM network.

In the embodiment illustrated in FIG. 1, the payment module 20 is in the remote control unit and communicates with the cable box 60. The cable box then transmits desired data to the network 80 through the connector 50. The cable box 60 also receives data from the remote system 200 through the network 80 and connector 50. The data received by the cable box 60 may be sent to the payment module 20 or the display screen 40, or both.

The user's local system 100 receives programming from a programming source 110 communicated through the network 80. In the illustrated embodiment, a network interface receives the programming and sends it to the display 40 through communication line 70, such as a television antenna cable. The programming may include various television stations as well as programming directed to an at-home retail system for selling to consumers various goods and services. In use, the user 10 may select among the various programs received by the local system 100, such as by changing channels on a television set, in the preferred cable television embodiment, or by selecting among menus in the computer-based embodiment.

Figure 3:
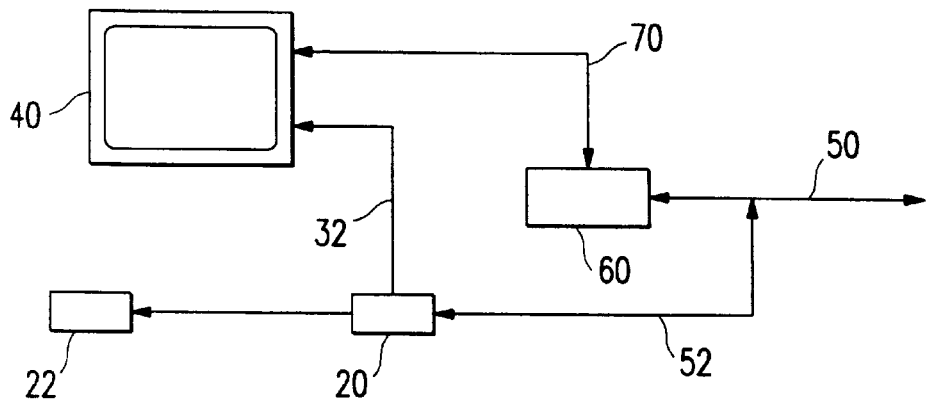
FIG. 3 is a block diagram of a local system of the remote financial transaction system of the present invention.

In an alternative embodiment, as illustrated in FIG. 3, the payment module 20 is separate from the controller 22, which is illustrated as remote control unit 22. The payment module 20 communicates with the display 40, either by a wired, or non-wired connection 32 and with the network through connector lines 52 and 50. The interface unit 60, such as a cable box, communicates with the network through line 50 and the display through line 70.

Figure 4:
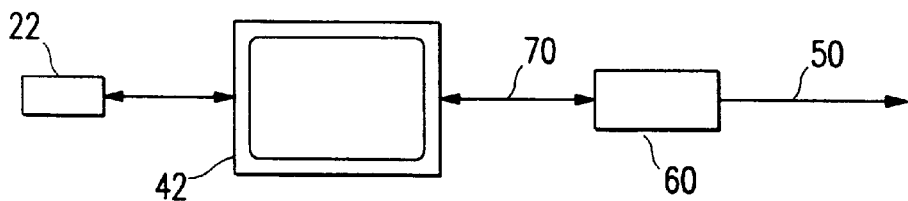
FIG. 4 is a block diagram of a local system of the remote financial transaction system of the present invention.

In the embodiment depicted in FIG. 4, the payment module is integrated with the display into one payment module/display unit 42. The payment module/display unit 42 may communicate with the network either directly through a connector or, as illustrated, through communication line 70, interface 60 and connector line 50.

Figure 5:
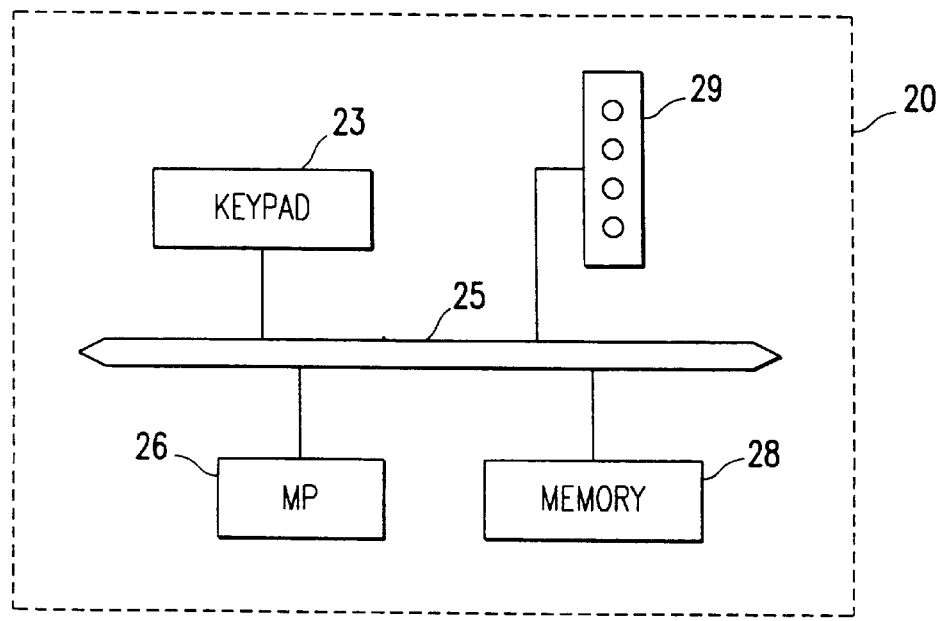
FIG. 5 is a system block diagram of a payment module of the present invention.

The preferred payment module 20 is a hand-held device capable of input by the user and sending output signals to a receiving device (such as display 40 or network interface 60). In one embodiment, as illustrated in FIG. 5, the payment module 20 includes an user input device, such as keypad 23. Preferably the keypad 23 contains the typical input keys used in television remote control devices, such as numerals from 0 through 9, channel control keys, and volume control keys. Alternatively, or additionally, the payment module may include other input devices such a light pen, mouse or touch-screen display. The keypad 23 communicates with data bus 25 for interaction with other components of the payment module 20. A data processor, such as microprocessor ("MP") 26 is included to control the payment module functions. A program and information storage device 28 (such as a programmable read only memory) provides storage for data pertaining to the user's payment accounts as well as software control of the payment module's processes. Other forms of memory devices may be used. For example, magnetic storage devices (i.e. disk drives), optical storage devices or any solid state storage device may be used as well as storage devices. The memory devices may be remote from the payment module (such as memory in an interface device, the display or in an off-site location). Output adapter 29 provides for remote communication between the payment module 20 and the receiving device.

In use, the payment module must be initialized with payment account passwords (i.e. "PINs") and other information related to the desired payment accounts. Any type of payment account may be used, such as credit card accounts, debit card accounts or checking accounts. Likewise, it is preferred to initialize the payment module with an access password, which will be called the "payment module password".

A preferred first step of the initialization process is to initialize the payment module with encryption keys 300 compatible with the DUKPT technique. Preferably, this initialization is performed by a service provider, such as the entity providing the remote financial transaction service. This way, the service provider may maintain decrypting keys or may provide them to the appropriate institution.

A next step of the initialization process is to initialize the payment module with user information corresponding to each payment account selected for use with the payment module. Preferably this is performed by a user using the payment module illustrated in FIG. 5. The user inputs the information using keypad 23. The information is stored in the payment module, such as in the program and information storage device 28. Instructions, menus and prompts are provided to the display 40 by communication with the payment module (such as using output 29).

Figure 6:
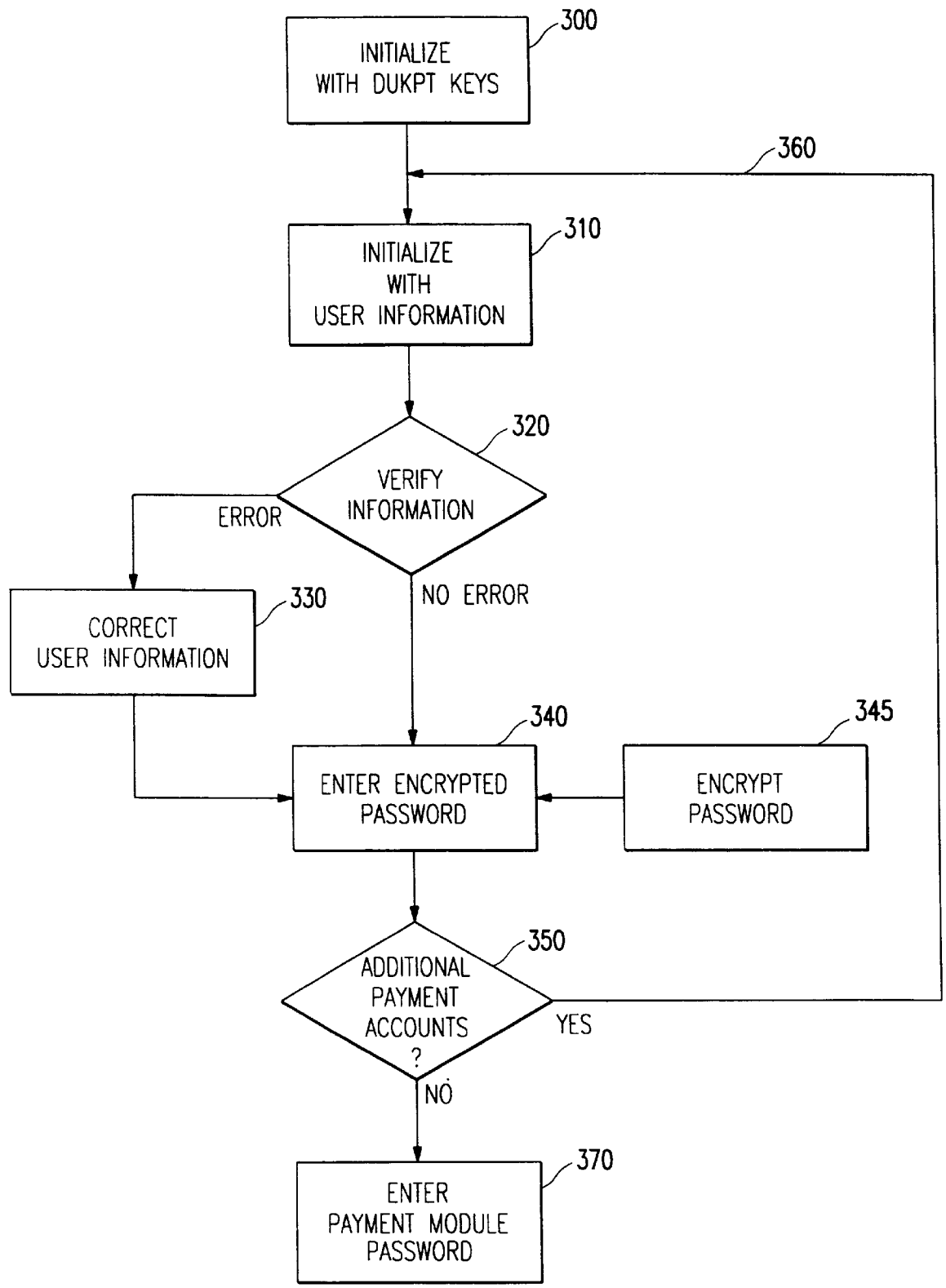
FIG. 6 is a flow chart showing a process for initializing the payment module of the present invention.

In the embodiment illustrated in FIG. 6, the payment module is initialized with information corresponding to a first credit card in step 310. Typically, the information input in this credit card initialization step 310 corresponds to Track 1 or Track 2 card data. Track 1 or Track 2 data are generally encoded on a magnetic strip on debit and credit cards. A magnetic strip reader is required to acquire the information off the magnetic strip. In use, the owner may swipe the card through the reader to have the data read. Track 1 data typically corresponds to the card owner's name, account number, expiration date and card verification value ("CVV") or a PIN verification value ("PVV"). The CVV and PVV are used to verify other information using known techniques. They generally are data values corresponding to other data on the magnetic stripe and are generated by the card issuer. Track 2 data typically is the same as the Track 1 data, but does not include the card owner's name.

The user information entered in step 310 may correspond to the Track 1 or Track 2 data, or both, or some other set of information. The information is entered by the user into the payment module. Preferably, the card issuer provides the user 10 with a sequence of characters which the user enters into the payment module. The sequence of numbers corresponds to the user information for entry in step 310. In the preferred embodiment, the payment module 20 sends signals to the display 40 corresponding to graphical menus and prompts and thereby leads the user through the data entry in a step-by-step process. Then, once data has been entered, a verification procedure 320 is applied. A typical verification procedure employs a known logical redundancy check in which characters are entered by the user in order to check to see if the user information was entered correctly. If an error is detected, a data correction sequence 330 is requested by the payment module. If no errors are detected, the initialization process continues to the next step.

In the next step 340, the user is prompted to enter the encrypted PIN associated with the card being initialized. The encrypted PIN may be provided by any processing step 345. In the preferred embodiment, the user is supplied with a paper encryptor, as discussed above. The paper encryptor is used to generate an encrypted PIN using an encryption key preferably maintained by the card issuer. The encryption key preferably is not maintained on the payment module. Hostile access to the payment module thereby will not yield the encryption key. The encrypted PIN is input by the user into the payment module, as directed by instructions provided to display 40 and the encrypted PIN is stored in the payment module.

In the next step 350, the system preferably inquires into whether or not there are additional cards to initialize. If there are additional cards, processing line 360 is followed and the additional cards are initialized as in steps 310–350. If there are no additional cards, processing continues on to the final initialization step.

In the final initialization step 370, the user is prompted to select a payment module password that will be used to control access to the payment module. The payment module password is then entered into the payment module and is stored, such as in the program and information storage device 28. Preferably, the payment module 20 may function as a remote controller for the display 40 or interface/cable box 60, without requiring input of the payment module password. Likewise, limited payment functions also would be enabled with input of the payment module password. Instead, the payment module password would be for enabling access to the ordering or payment system. Thus, the user's payment accounts and encrypted PINs only could be used by that user.

In an alternative embodiment payment module passwords and payment account information may be input by more than one user. Access to each user's payment accounts is limited the users' respective payment module passwords.

In another embodiment, the payment module may be initialized with payment account information at a processing center, such as a bank. In this embodiment, the processing center has a magnetic strip reader which is connected to the payment module such that it may transmit data to the payment module. The magnetic strip reader thus supplements or supplants the keypad 23 as an input device for the initialization process. The operator swipes the selected cards through the magnetic strip reader. This swiping is done in a way enabling the magnetic strip reader to read desired information off the magnetic strip, such as Track 1 or Track 2 information. The magnetic strip reader then outputs the desired information automatically to the payment module and the payment module stores the information as discussed previously. In addition, the user may input desired PINs into the magnetic strip reader, such as by using an associated keypad. The magnetic strip reader then can process the input PINs to encrypt them and the encrypted PINs are sent on to the payment module for storage.

Figure 7:
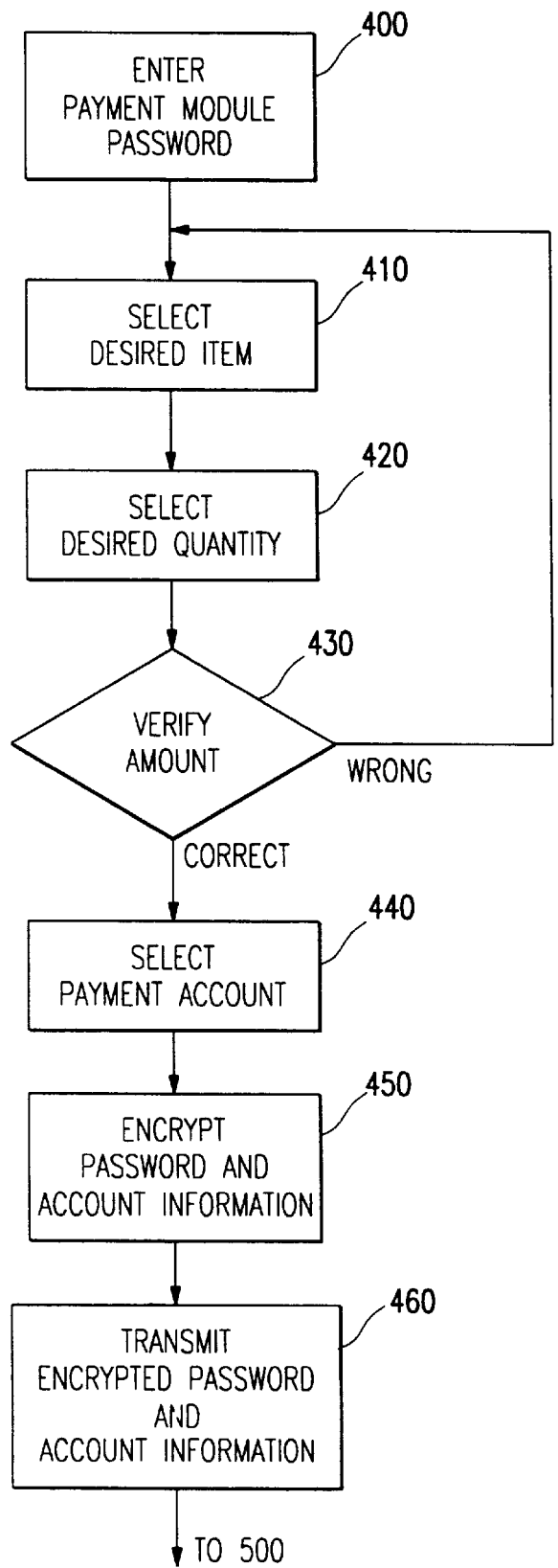
FIG. 7 is a flow chart showing a process for conducting a purchase transaction of the present invention.
Figure 8:
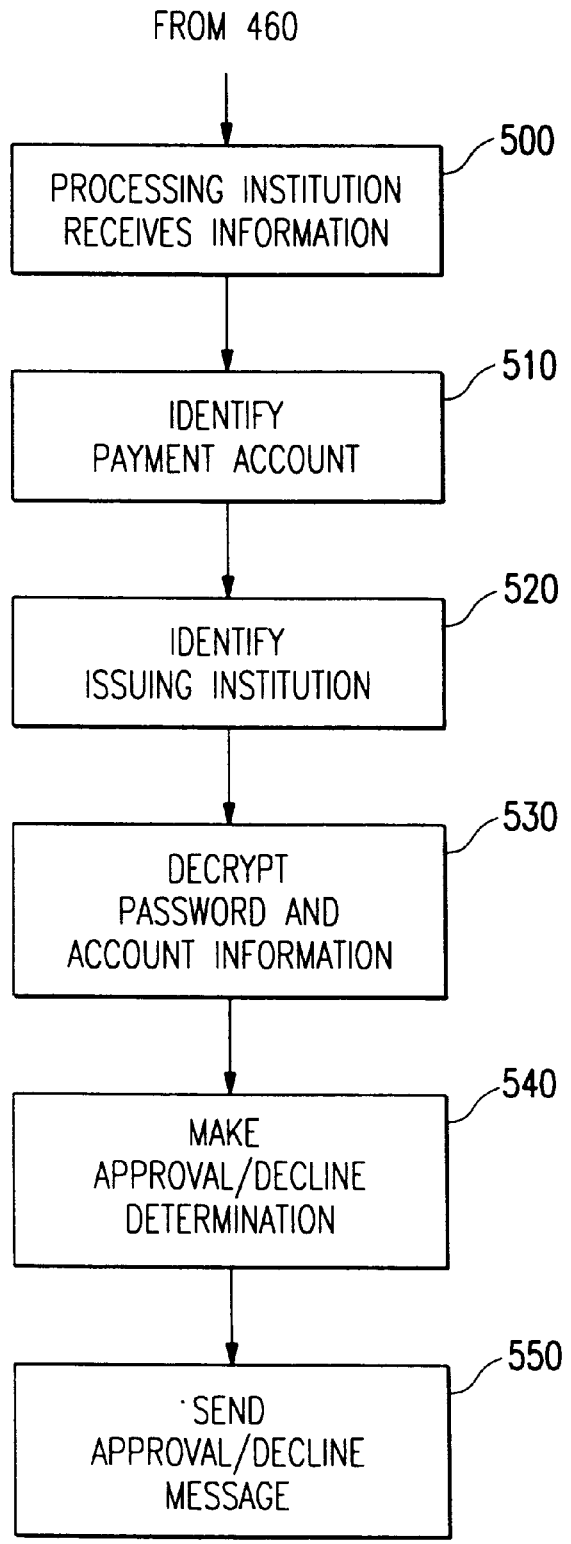
FIG. 8 is a flow chart showing procedures conducted in a remote system for processing the purchase transaction of FIG. 7.

In operation, various financial transactions may be performed using the payment module. In a typical transaction, which is illustrated in FIG. 7, the user may purchase goods or services. The payment module may also be used to perform electronic fund transfers, such as to pay bills and transfer funds between various accounts.

Common to all these transactions is the automatic provision of the account information (such as Track 1 or Track 2 data) and encrypted PINs by the payment module without any input of the information or unencrypted PINs by the user, with the exception of the payment module password, which can be entered to access the financial transaction feature of the payment module. The number of passwords/PINs that a user must remember and deal with is thereby reduced.

In operation, the purchase transaction is guided by a sequence of interactive prompts appearing on the display 40. Preferably the prompts are provided by the payment module 20, but they also may come from a remote location through the network. In a typical transaction, the user is prompted to enter his payment module password, as indicated in step 400. The user is then directed through prompts and menus to select a particular transaction.

In making a purchase, the item(s) desired is specified. For example, the user specifies the goods or services desired 410 (such as by entering a product code), and the quantity desired 420. The user then is preferably prompted to verify a dollar amount corresponding to the desired purchase 430. If the user disagrees with the dollar amount, processing is returned to step 410 for re-selection of the item(s) desired.

After the dollar amount is verified, the user selects a payment method 440. The payment method is one of the payment accounts with which the payment module is initialized. For example, the user may select among various credit or debit cards with which the payment module was initialized. Preferably, the user selects the desired payment account by pressing an appropriate selection on the keypad 23, as indicated on a menu displayed on the display 40.

In step 450, for additional security, the payment module then encrypts a second time the previously encrypted PIN corresponding to the selected payment method. This encryption 450 may be performed using any encryption technique but preferably performed using the DUKPT technique. Similarly, desired account information is encrypted in step 450. The account information may correspond to the Track 1, Track 2 or other desired account information.

The doubly encrypted PIN and encrypted account information are then transmitted through the interactive network 80 as shown in step 460.

The interactive network preferably is in communication with a processing institution 90, such as a bank's processing department. A plurality of other processing institutions also can be connected in with the network, such that the user, or the entity offering the in-home purchasing system could select among processing institutions.

The encrypted PIN and account information are received by the processing institution 90 through the network 80 as depicted in step 500. The processing institution 90 would then identify the payment account from the account information as indicated in step 510. Typically, the processing institution 90 receives the encrypted PIN and account information in a data processing system. The data processing system decrypts the encrypted account information. From the decrypted account information, the data processing system identifies the payment account number and identifies the institution 95 maintaining the account, such as the pertinent bank or financial institution, as indicated in step 520. Typically, the institution maintaining the account is identifiable from the account numbers because payment account numbers generally include an identifiable code specific to each issuing institution.

The processing institution then transmits the encrypted PIN and the account information (either encrypted or unencrypted) through the network 80 to the payment account institution 95. The payment account institution then decrypts the encrypted PIN and the account information, if necessary, as indicated in step 530. Typically, the payment account institution 95 receives this data in a data processing system. The data processing system decrypts the encrypted account information. The account number and PIN preferably are verified and then the payment account institution 95 determines whether to approve or decline the transaction, as indicated in step 540. For example, with respect to verification, the institution may verify the account number by checking a database of existing account numbers; and the institution may verify the PIN by ascertaining that it corresponds to the PIN assigned to that account number. With respect to determining whether to approve or decline a transaction, such as a purchase, the institution may check the desired purchase price against a credit limit on the account; if the purchase will exceed a credit limit, the transaction typically will be declined.

Once the payment account institution 95 determines whether it will approve or decline the transaction, an approve/decline message is sent through the network 80 back to the local system.

Thus, it is seen that a remote financial transaction system is provided. One skilled in the art will appreciate that the present invention can be practiced by other than the preferred embodiments which are presented for purposes of illustration and not of limitation, and the present invention is limited only by the claims which follow.

What is claimed is:

1. A method for performing remote financial transactions using a remote user operated payment module that communicates with a transaction processing system, in which the remote user operated payment module is operable in a home, the method comprising the steps performed by the remote user operated payment module, of:

storing, in the remote user operated payment module, one or more remote user operated payment module access passwords, said one or more remote user operated payment module access passwords being different from account information;

storing, in the remote user operated payment module, information corresponding to at least one payment account selected for use with the remote user operated payment module;

receiving, from a user, an encrypted account password for each payment account selected for use with the remote user operated payment module, wherein a decryption key for the encrypted password is maintained by the transaction processing system and is not available to the user and the remote payment module;

storing, in the remote user operated payment module, the encrypted password for each payment account selected for use with the remote user operated payment module;

receiving, from a user, a payment module access password;

authenticating a user using the received payment module access password and one of the one or more stored remote user operated payment module access passwords;

selecting a payment account from the at least one payment account selected for use with the remote user operated payment module;

encrypting and sending the stored information corresponding to the selected payment account to the transaction processing system;

encrypting the stored encrypted account password for the selected payment account to form a twice-encrypted password; and sending the twice-encrypted password to the transaction processing system.

2. A method as recited in claim 1 wherein the step of encrypting the stored encrypted account password uses a derived unique key to form the twice-encrypted password.

3. A method as recited in claim 1 wherein the step of authenticating further comprises the step of:

comparing the received payment module access password with the one of more stored remote user operated payment module access passwords.

4. A method as recited in claim 1 wherein the information corresponding to at least one payment account corresponds to information included in a first or second magnetic stripe of a credit card.

5. A method as recited in claim 1 wherein the user interactively selects the selected payment account.

6. A method as recited in claim 1 wherein each remote user operated payment module access password corresponds to at least one payment account selected for use with the remote user operated payment module.

7. A method as recited in claim 6 wherein the step of selecting a payment account selects a payment account that corresponds to the remote user operated payment module access password used to authenticate the user.

8. A method for performing remote financial transactions using a remote user operated payment module operable in a home that communicates with a transaction processing system, wherein the remote user operated payment module stores information corresponding to at least one payment account for each user of the remote user operated payment module, wherein the remote user operated payment module stores a remote user operated payment module access password for each user, said remote user operated payment module access password being different from account information, and wherein the remote user operated payment module receives and stores an encrypted account password corresponding to each payment account wherein a decryption key for the encrypted password is maintained by the transaction processing system and is not available to the user and the remote payment module, the method comprising the steps, performed by the remote user operated payment module, of:

receiving a payment module access password;

authenticating a user using the received payment module access password and one of the one or more stored remote user operated payment module access passwords;

interactively selecting a payment account based on input from the authenticated user;

encrypting and sending the stored information corresponding to the selected payment account to the transaction processing system;

encrypting the stored encrypted account password for the selected payment account to form a twice-encrypted password; and sending the twice-encrypted password to the transaction processing system.

9. A method as recited in claim 8 wherein the step of encrypting the stored encrypted account password uses a derived unique key to form the twice-encrypted password.

10. A method as recited in claim 8 wherein the information corresponding to at least one payment account corresponds to information included in a first or second magnetic stripe of a credit card.

11. A remote user operated payment module operable in a home for performing remote financial transactions, the apparatus comprising:

a first portion configured to store one or more remote user operated payment module access passwords said one or more remote user operated payment module access passwords being different from account information;

a second portion configured to store information corresponding to at least one payment account selected for use with the remote user operated payment module;

a third portion configured to receive and store a respective encrypted account password for each payment account selected for use with the remote user operated payment module wherein a decryption key for the encrypted password is maintained by the transaction processing system and is not available to the user and the remote payment module;

a fourth portion configured to receive a payment module access password and authenticate's user using the received payment module access password and one of the one or more stored remote user operated payment module access passwords;

a fifth portion configured to select a payment account from the at least one payment account selected for use with the remote user operated payment module;

a sixth portion configured to encrypt and send the stored information corresponding to the selected payment account to a transaction processing system;

a seventh portion configured to encrypt the stored encrypted account password for the selected payment account to form a twice-encrypted password; and an eighth portion configured to send the twice-encrypted password to the transaction processing system.

12. A remote user operated payment module as recited in claim 11 wherein the seventh portion is configured to use a derived unique key to form the twice-encrypted password.

13. A remote user operated payment module as recited in claim 11 wherein the information corresponding to at least one payment account corresponds to information included in a first or second magnetic stripe of a credit card.

14. A remote user operated payment module as recited in claim 11 wherein the fifth portion is configured to select a payment account using interactive input from the user.

15. A remote user operated payment module as recited in claim 11 wherein each remote user operated payment module access password corresponds to at least one payment account selected for use with the remote user operated payment module.

16. A remote user operated payment module as recited in claim 15 wherein the fifth portion is configured to select a payment account that corresponds to the remote user operated payment module access password used to authenticate the user.

17. A computer program product comprising a computer usable medium having computer readable code embodied therein for performing remote financial transactions, the computer program product comprising:

a first portion configured to cause a remote user operated payment module operable in a home to store one or more remote user operated payment module access passwords said one or more remote user operated payment module access passwords being different from account information;

a second portion configured to cause the remote user operated payment module to store information corresponding to at least one payment account selected for use with the remote user operated payment module;

a third portion configured to cause the remote user operated payment module to receive and store a respective encrypted account password for each payment account selected for use with the remote user operated payment module wherein a decryption key for the encrypted password is maintained by the transaction processing system and is not available to the user and the remote payment module;

a fourth portion configured to cause the remote user operated payment module to receive a payment module access password and authenticate a user using the received payment module access password and one of the one or more stored remote user operated payment module access passwords;

a fifth portion configured to cause the remote user operated payment module to select a payment account from the at least one payment account selected for use with the remote user operated payment module;

a sixth portion configured to cause the remote user operated payment module to encrypt and send the stored information corresponding to the selected payment account to a transaction processing system;

a seventh portion configured to cause the remote user operated payment module to encrypt the stored encrypted account password for the selected payment account to form a twice-encrypted password; and an eighth portion configured to cause the remote user operated payment module to send the twice-encrypted password to the transaction processing system.

18. A computer program product as recited in claim 17 wherein the seventh portion is configured to a derived unique key to form the twice-encrypted password.

19. A computer program product as recited in claim 17 wherein the information corresponding to at least one payment account corresponds to information included in a first or second magnetic stripe of a credit card.

20. A computer program product as recited in claim 17 wherein the fifth portion is configured to cause the remote user operated payment module to select a payment account using interactive input from the user.

21. A computer program product as recited in claim 17 wherein each remote user operated payment module access password corresponds to at least one payment account selected for use with the remote user operated payment module.

22. A computer program product as recited in claim 21 wherein the fifth portion is configured to cause the remote user operated payment module to select a payment account that corresponds to the remote user operated payment module access password used to authenticate the user.

* * * * *

UNITED STATES PATENT AND TRADEMARK OFFICE
CERTIFICATE OF CORRECTION

PATENT NO. : 5,999,624

DATED : December 7, 1999

INVENTOR(S) : W. Dale Hopkins

It is certified that error appears in the above-identified patent and that said Letters Patent is hereby corrected as shown below:

Claim 11, line 67:

change "authenticate's" to --authenticate a--

Signed and Sealed this

Eleventh Day of July, 2000

*Attest:*

Q. TODD DICKINSON

*Attesting Officer*  *Director of Patents and Trademarks*